United States Patent [19]

Rembold et al.

[11] Patent Number: 4,879,984

[45] Date of Patent: Nov. 14, 1989

[54] FUEL INJECTION PUMP FOR INTERNAL COMBUSTION ENGINES

[75] Inventors: Helmut Rembold, Stuttgart; Ernst Linder, Muehlacker; Gottlob Haag, Markgroningen, all of Fed. Rep. of Germany

[73] Assignee: Robert Bosch GmbH, Stuttgart, Fed. Rep. of Germany

[21] Appl. No.: 299,587

[22] Filed: Jan. 23, 1989

[30] Foreign Application Priority Data

Feb. 10, 1988 [DE] Fed. Rep. of Germany ....... 3804025

[51] Int. Cl.$^4$ .......................................... F02M 39/00
[52] U.S. Cl. .................... 123/450; 123/506; 417/462
[58] Field of Search ............. 123/450, 506, 458; 417/462

[56] References Cited

U.S. PATENT DOCUMENTS

| | | | |
|---|---|---|---|
| 2,930,369 | 3/1960 | Halberg | 123/450 |
| 2,974,657 | 3/1961 | Bessiere | 123/450 |
| 4,001,274 | 7/1986 | Seilly | 417/462 |
| 4,180,037 | 12/1979 | Hobo | 417/462 |
| 4,457,277 | 7/1984 | Adey | 123/450 |
| 4,625,694 | 12/1986 | Adey | 417/462 |
| 4,662,825 | 5/1987 | Djordjevic | 123/506 |
| 4,725,209 | 2/1988 | Shibata | 123/450 |
| 4,757,795 | 7/1988 | Kelly | 123/458 |

FOREIGN PATENT DOCUMENTS

| | | | |
|---|---|---|---|
| 161969 | 3/1955 | Australia | 123/450 |
| 2136431 | 1/1972 | Fed. Rep. of Germany | 123/450 |
| 1346584 | 2/1974 | United Kingdom | 123/450 |

Primary Examiner—Carl S. Miller
Attorney, Agent, or Firm—Edwin E. Greigg

[57] ABSTRACT

To reduce the construction expense and the space required for a fuel injection pump for supplying a plurality of cylinders of an engine, in particular an internal combustion engine having externally supplied ignition, a fuel injection pump including a drive shaft with a single common cam drives a plurality of pump plungers. The supply quantity is controlled via a rotary slide and a subsequent common distributor delivers the fuel to the injection nozzles at the injection sites of the engine. The quantity of fuel injected is effected by an electrically controlled valve seated in a relief line that branches off downstream of the rotary slide, which by closure of the relief line determines the injection phase.

23 Claims, 3 Drawing Sheets 4,879,984

FUEL INJECTION PUMP FOR INTERNAL COMBUSTION ENGINES

BACKGROUND OF THE INVENTION

The invention is based on a fuel injection pump for internal combustion engines. In a known fuel injection pump of this type, two pump plungers located side by side are provided in one pump housing, each plunger being driven by a separate camshaft. Each plunger pumps into a single fuel injection line assigned to it and leading to a fuel injection valve on an associated internal combustion engine. The injection quantity is controlled via a common overflow conduit, which can be opened by means of a magnetic valve to provide a relief volume. The pump plungers also execute their pumping strokes in alternation, and a slide valve control is provided so that the fuel quantity pumped at high pressure by one plunger cannot flow out to the relief side during the intake or filling stroke of the other plunger. The pump plunger itself, with a control edge, acts as the valve slide. Alternatively, check valves are also provided, some of them in the fuel fill line of the various pump work chambers. Thus, the known fuel injection pump is designed in the manner of an inline injection pump, in which each pump plunger serves to supply fuel to one injection site.

OBJECT AND SUMMARY OF THE INVENTION

With the fuel injection pump according to the invention, fuel supply to a plurality of injection sites is advantageously attained, and to attain the high injection pressure for one injection site, a plurality of pump plungers cooperate simultaneously. In this way, a high pumping rate is achieved with a small-sized fuel injection pump, and this rate is continuously available in succession to each injection nozzle.

The characteristics recited herein disclose advantageous further features of the invention. Advantageously, a subdivided injection can also take place for each cylinder of an engine, that is, a pre-injection after a change in the charge of the cylinder after top dead center and a primary injection at the end of the compression stroke before top dead center. This has advantages particularly for an engine having externally supplied ignition and in which the fuel is injected directly into the combustion chamber.

The fuel injection pump has an advantage that the number of pump plungers can be reduced, and with compensation by means of a higher pumping stroke sequence, a number of injection sites that is a multiple of the number of pump plungers can be supplied with fuel. Accordingly, a subdivided injection and a balance of forces at the distributor is advantageously attained.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
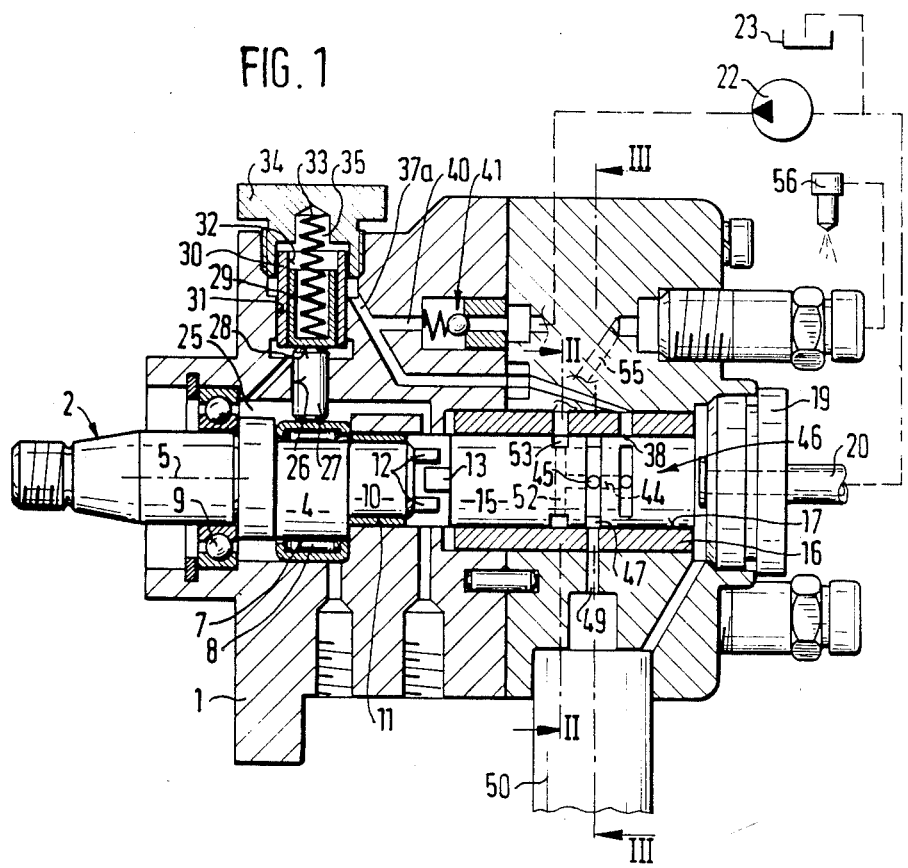
FIG. 1 shows a first exemplary embodiment of the invention, having a distributor driven coaxially with the drive shaft and having four pump plungers that are driven by the drive cam.

In a distributor fuel injection pump as shown in FIG. 1, a drive shaft 2 enters a pump housing 1 from the outside and is supported in the housing. A longitudinal drive cam 4 is disposed horizontally on the drive shaft in the housing. This cam has a cam race 7 located eccentrically with respect to the axis 5 of the drive shaft 2, and a roller bearing or needle bearings 8 is preferably disposed on the race 7. Where the drive shaft passes through the housing, the drive shaft is supported on a ball bearing 9, and its opposite end portion, adjacent to the drive cam 4, is embodied as a tang 10 that is supported in a slide bearing 11 inserted into the housing. On its face end, the tang has axially extending coupling claws 12, which cooperate with corresponding axially extending coupling claws 13 of a distributor 15 that is in axial alignment with the axis 5 of the drive shaft and the tang 10. The distributor is supported in a guide bore 17, formed by a cylinder liner 16, which is closed on the side remote from the drive shaft by a plug 19 introduced into a bore in the housing; together with the tang 10, the plug serves to secure the distributor axially. A fuel leakage line 20 leads through the plug 19 and back to the fuel supply, or to the intake side of a fuel pre-feeding pump 22, which supplies fuel from a fuel tank 23 to the fuel injection pump.

In a radial plane with respect to the drive cam, radial bores 26, only one of which is shown in FIG. 1, lead away from the chamber 25 in the fuel injection pump housing 1 that receives the cam 4 and needle bearing 8. A pump plunger tappet 27 is displaceable in each of these bores; one face end of the tappet rests on the needle bearing 8, and its other face end rests on the outer face end 28 of a spring loaded cup-shaped pump plunger 29. Lubricating oil for the cam, pump plunger 29 and bearings is supplied via inlet and outlet lines 70 and 71. The pump plunger is guided in a cylinder bore 32 of a cylinder liner 30, which is accommodated in a bore 31 adjoining and coaxial with the radial bore 26. The inner face end of the pump plunger is engaged by a compression spring 33, which is braced on its other end on a plug 34 which closes the bore 31 and keeps the pump plunger in contact with the pump tappet 27 and the pump tappet in turn in contact with the cam 4. Enclosed between the plug 34 and the cylinder liner 30 or pump plunger 29 is a pump work chamber 35. The pump work chamber 35 is supplied with fuel via a longitudinal groove (not shown) which extends from its plug end down to an annular groove 30a from which an overflow conduit 37 leads away and which discharges into a conduit segment 37a which extends to an overflow opening 38 in a radial plane of the guide bore 17. Besides the abovedescribed pump plunger having the conduit 37, there are three additional like pump plungers and conduits distributed in the pump housing at regular intervals about the axis 5. Further conduit segments 37b, 37c and 37d, shown in FIG. 3, lead from the corresponding pump work chambers 35 and conduits 37 into the guide cylinder 17. A respective fill line 40 that discharges into each of the conduits 37 branches off from the feed side of the fuel pre-feed pump 22 and includes a one-way check valve 41 that opens in the direction of the pump work chamber. Instead of the check valve, a rotary valve may be provided, which opens the fill line passage in each intake phase of the pump plunger. The distributor itself may be embodied as a rotary valve and may have suitable longitudinal control grooves. The pump work chamber receives fuel from the fill line 40 and the fuel is pumped out via conduit 37.

In the radial plane defined by the mouth of the overflow openings 38, the distributor is embodied as a rotary valve 46 and to this end has a recess, which in the exemplary embodiment described comprises a partial annular groove 42, which extends over an angle of 180° and continuously connects at least two of the conduit segments 37a–37d with one another. From the partial annular groove 42, a radial bore 43 leads away to a longitudinal axial bore 44, which is closed on both ends at the ends of the distributor. Via this longitudinal bore 44 and a transverse bore 45, the partial annular groove 42 communicates with a continuous outer annular groove 47 in the jacket face of the distributor. In the vicinity of this outer annular groove 47, a relief line 49 leads away from the guide bore 17; the relief line may for instance communicate with the leakage line 20, and its flow cross section may be opened or closed by an electrically controlled valve 50.

Also leading away from the longitudinal bore 44 is a second radial bore 52, which leads to a distributor opening 53 on the jacket face of the distributor. Leading away from the guide bore 17 in the radial plane defined by this distributor opening 53 are pressure lines 55, each of which communicate, optionally via an interposed check valve or relief valve 55a, with a fuel injection valve 56 assigned to one of the injection sites on the engine. Such pressure lines 55 are distributed over the circumference of the guide bore 17 in a number equivalent to the number of engine cylinders or injection sites to be supplied. They are supplied with fuel at injection pressure in alternation, upon the rotation of the distributor at corresponding pump plunger supply strokes. The injection duration is determined by the electrically controlled valve 50, which when triggered by a corresponding control circuit determines the injection onset upon closure of the relief line and determines the end of injection upon opening of the relief line. At the same time, both the injection quantity and the phase setting of the injection are determined thereby.

Figure 2:
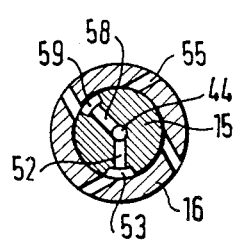
FIG. 2 is a first section taken through the distributor of FIG. 1 along lines II—II.

A third radial bore 58, as shown in section in FIG. 2, may also communicate with the longitudinal bore 44, which is part of the overflow conduit 37 leading to the distributor opening or to the relief line. This radial bore 58 extends, within a radial plane shared with the second radial bore 42, to a second distributor opening 59 in the jacket face of the distributor and is in advance of the first distributor opening 53 by an angle of 135°, assuming a fuel injection pump with four pressure lines 55 triggered upon each rotation of the distributor and distributed at regular intervals. The second distributor opening 49 then communicates with one of the pressure lines 55 at a time, whenever the first distributor opening has been closed by the guide bore 17. In this way, with the aid of the electrically controlled valve, the fuel injection quantity pumped both via the first distributor opening 53 and via the second distributor opening 59 can be controlled. In this manner, a sequential injection into each cylinder is obtained, comprising a pre-injection supplied via the second distributor opening 59 and a main injection supplied via the first distributor opening 53. In engines having externally supplied ignition, it is thus possible for a pre-injection of fuel into the cylinder to take place in a known manner as the intake stroke of the engine piston begins, this fuel quantity then having sufficient time, over a crankshaft angle of only slightly less than 180°, to mix with the aspirated combustion air. The main injection then takes place shortly before the actual instant of ignition, before the end of the compression stroke. When direct injection into the engine combustion chambers is used, such an injection sequence makes possible fuel-saving combustion, with low toxic emissions and in particular with little soot.

Figure 3:
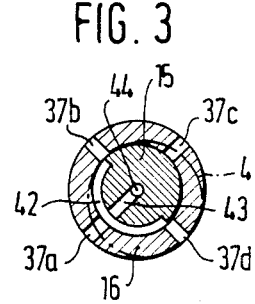
FIG. 3 is a second section taken through the distributor of FIG. 1 along lines III—III.
Figure 4:
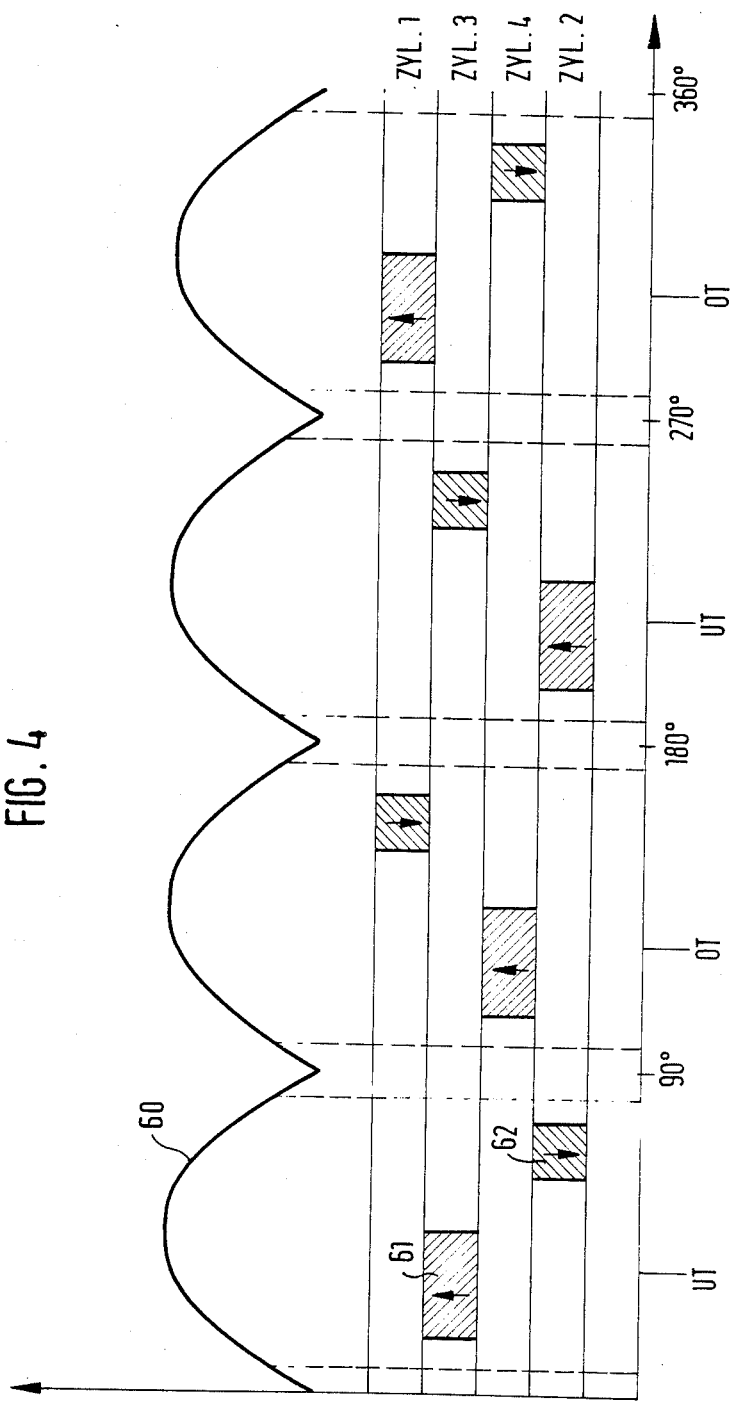
FIG. 4 is a control diagram of the output of the pump.

FIG. 4 illustrates a control diagram of the above-described fuel injection pump. The pumping diagram of the fuel injection pump is plotted, in the form of a pumping characteristic curve 60, over the crankshaft angles of the associated engine. Maximum values for the pumping quantity occur at 90° intervals, which is due to the fact that, as FIG. 3 shows, two pump plungers, the pumping strokes of which occur in succession, always deliver their pumped fuel quantity, for instance via the conduit segments 37a and 37d, to the partial annular groove 42, from whence the fuel is delivered via the continuing overflow conduit, the longitudinal bore 44, and the distributor openings 53 or 59. In this phase, the other pump plungers are still in the intake stroke, in which they aspirate fuel into the pump work chamber 35 via the check valve 41 or fill line 40. With the pump plunger in the pumping stroke phase, the aforementioned check valve 41 is closed, and communication via the conduit segments 37b and 37c with the pump plunger that just then is aspirating is interrupted by the jacket valve of the distributor. As the rotation of the drive cam 4 progresses, the next pump plungers in succession are each shifted into their pumping stroke phase and correspondingly made to communicate with the longitudinal bore 44 through the recess 42. Nevertheless, the pumping flow is not continuous, because of the limited number of pump plungers; hence the maximum and minimum pumping values shown in the curve at the top of FIG. 4.

The control times are plotted below the pumping characteristic curve 60, as follows: The times of the main injection via the distributor opening 53, at which the main fuel quantity is delivered to the combustion chamber just prior to the instant of ignition, are shown at 61, and the pre-injection control times are shown at 62. These control times are preferably in the zone near the various maximum supply points shown on the pumping characteristic curve 60, because in this zone an optimal fuel injection pressure can be expected. To prevent the pressure in the pump work chambers and in the conduit segments or in the entire overflow conduit from becoming excessively high whenever the injection times become minimally short or the injection quantities become minimally small, a pressure maintenance valve that limits the maximum pressure can be provided either parallel to or integrated with the electrically controlled valve 50.

Although the above-described fuel injection pump of FIG. 1 is intended for a pre-injection and a main injection, the pre-injection can naturally be dispensed with. Then the electrically controlled valve is triggered suitably differently, and the second distributor opening 59 is omitted. If a different number of engine cylinders is to be supplied with a fuel injection pump designed for pre-injection, the second distributor opening 59 is in advance of the first distributor opening 53 by 1½ times the angular spacing of the various pressure lines 55 from one another. This basic dimensioning is also assumed in the version shown in FIG. 2. Naturally, a departure from these angles can be made if the pre-injection is shifted to later, so that a smaller portion of the intake and compression stroke of the piston of the associated engine cylinder is utilized for fuel preparation. It is essential in this respect that there be no overlap between the pre-injection into one cylinder and the main injection into the other cylinder.

Figure 5:
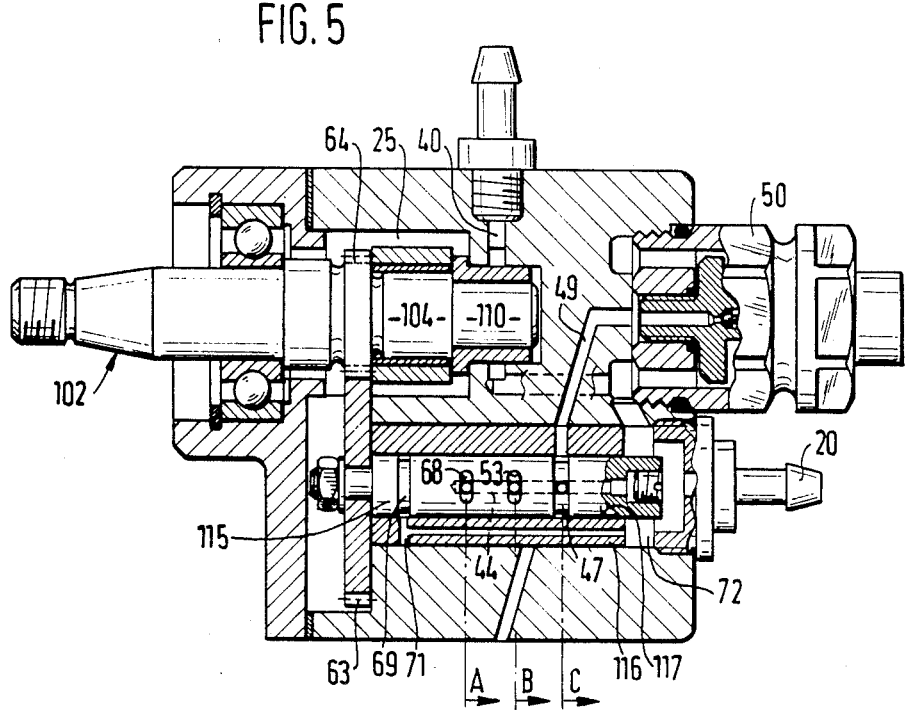
FIG. 5 shows a second exemplary embodiment of the invention in longitudinal section.

In FIG. 5, a second exemplary embodiment of a fuel injection pump is shown, in which the distributor 115 is now disposed beside and parallel with the drive shaft 102. The distributor 115 is guided, as before, in a guide bore 117 of a cylinder liner 116. However, a gear wheel 63 is now secured to one face end of the distributor 115, cooperating with a corresponding gear wheel 64 of the drive shaft 102. The gear wheel 64 is located inside the chamber 25 on the side of the cam 104 remote from the tang 110. Only two pump plungers such as shown in FIG. 1 are actuated by the cam, this actuation not being further shown here. In the same manner as in the exemplary embodiment of FIG. 1, the pump work chambers of the pump plungers are supplied with fuel via the fill line 40, which includes the check valve or a rotary slide valve. This feature is not shown in FIG. 5, either, but may be seen by referring to FIG. 1.

Figure 6A:
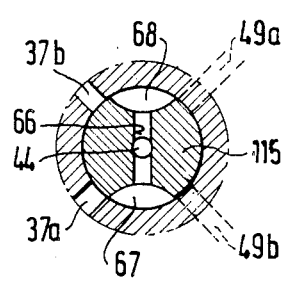
FIGS. 6A, 6B and 6C show three fragmentary sections through the distributor of the exemplary embodiment of FIG. 5, in planes A, B and C.
Figure 6B:
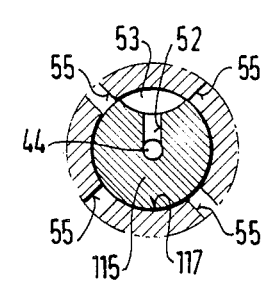
Figure 6C:
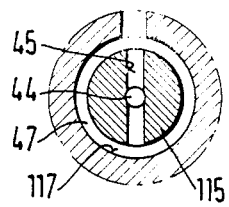

Similarly to the embodiment of FIG. 1, the longitudinal bore 44 is again provided in the distributor 115, communicating via the transverse bore 45 with the outer annular groove 47 in the jacket face of the distributor; this is shown in FIG. 6c, which is a section taken along the line C—C through the distributor of FIG. 5. As in the exemplary embodiment of FIG. 1, the relief line 49 leads away from the outer annular groove and is controlled via the electrically controlled valve 50.

Once again, the second radial bore 52, which leads to the distributor opening 53, branches off from the longitudinal bore 44; see FIG. 6B, which is taken along the line B—B of FIG. 5. Finally, instead of the first radial bore of FIG. 1, a transverse bore 66 branches off from the longitudinal bore 44, leading to two recesses 67 and 68 on the jacket face of the distributor. These diametrically opposed recesses are located in a radial plane, and a first conduit segment 37a and a second conduit segment 37b, coming from the pump work chamber, of the overflow conduit 37 discharge in this radial plane into the guide bore 117, where once again, together with the distributor, they form a rotary valve 46 there. These conduit segments are offset from one another by 90°, for the described example of a fuel injection pump for supplying four injection sites at regular intervals. Correspondingly, four pressure lines spaced apart by equal angles, leadaway, in the radial plane of the distributor opening 53 to the injection valves 56.

In its jacket face, between the gear wheel 63 and the longitudinal bore 44, the distributor has an outer annular relief groove 69 on the end facing gear wheel 63, which communicates continuously with a leakage line 71 extending in the wall of the cylinder liner 116 and discharging into a relief chamber 72 bordering on the cylinder liner 116. Downstream of the electrically controlled valve 50, the relief chamber 72 communicates with the relief line 49, which leads via the relief chamber 72 to the leakage line or return line 20.

In this exemplary embodiment, the pairing of the gear wheels 63 and 64 is intended such that the distributor 115 rotates at half the speed of the drive shaft 102. Even though the drive shaft now drives only two pump plungers, four pump plunger supply strokes per revolution are now available to the distributor 115. Via the separate triggering of the conduit segments 37a and 37b by the recesses 67 and 68, the supply quantity is delivered separately to the distributor for further passage into the pressure conduits 55. Because of the absence of overlap of the supply strokes of each two actively pumping pump plungers, as in the embodiment of FIG. 1, the embodiment of FIG. 5 has even more marked maximum and minimum points. However, the construction cost is less, with substantially the same output, because only half the number of pump plungers is needed.

An alternative embodiment to the disposition of the annular groove 47 in combination with the relief line 49 is attainable by making the control site as shown in FIG. 6A by making the control site of section C—C coincide with that of section A—A. Then the annular groove 47 is dispensed with entirely, and two further lines leading away from the guide bore are provided on the circumference of the distributor, as shown in dashed lines in FIG. 6A; these lines are line segments 49a and 49b of the relief line 49 and are located diametrically opposite the mouths of the conduit segments 37a and 37b. With this embodiment, each time one conduit segment is opened by one of the recesses 68 and 67, one line segment 49a or 49b is opened by the other of the recesses 68 or 67, so that once again the electrically controlled valve 50 can control the high-pressure pumping phase. This reduces the construction expense for the distributor and decreases the idle volume.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. An electrically controlled fuel injection pump operative for direct fuel injection in an internal combustion engine having externally supplied ignition, a drive shaft (2, 102), a drive cam (4, 7; 104) on said drive shaft, a plurality of cylinder bores (32), one each of a plurality of pump plungers (29) guided in one each of plurality of cylinder bores and driven at a constant stroke by said drive cam (4, 7; 104) said cam rotated by said drive shaft (2, 102) of said fuel injection pump, a pump work chamber in each of said pump plungers and said cylinder bores, a longitudinal bore in said fuel injection pump, a slide valve (46) in said longitudinal bore which is driven in synchronism with said drive shaft, said slide valve forming a rotationally driven distributor (15) including a recess (42) in its jacket face, a radial conduit (43) which extends from said recess to an axial conduit (44), means extending from said axial conduit which communicates during rotation with a distributor opening which aligns with a plurality of conduit segments (55) that extend through said injection pump and which connect one each with a pressure line to a fuel injection valve for each cylinder of said engine, a relief conduit (49) that extends from said axial conduit to an electrically controlled valve (50) which is connected to a low pressure chamber, a plurality of overflow conduits in said fuel injection pump, one each of said overflow conduits extending from one each of said work chambers (35), each of said overflow conduits extending to one each of conduit segments (37a–37d) in said cylinder line in planar alignment with said recess (42), said recess has a circumferential extent such that at least two of said conduit segments are connected with said recess at the same time during rotation of said slide valve, said electrically controlled valve (50) is controlled by a control circuit so that fuel pumped by each of said pump plungers and controlled by rotation of said slide valve is directed to each of said fuel injection valves while said electrically controlled valve is closed, and fuel is directed to said low pressure chamber during opening of said electrically controlled valve.

2. A fuel injection pump as defined by claim 1, in which said cam (4) has a cam race in the form of a circular race (7) located eccentrically with respect to the drive shaft axis (5) on which race a roller bearing (8) is mounted.

3. A fuel injection pump as defined by claim 1, in which said relief line (49) communicates continuously with said axial conduit (44) of said slide valve.

4. A fuel injection pump as defined by claim 2, in which said relief line (49) communicates continuously with said axial conduit (44) of said slide valve.

5. A fuel injection pump as defined by claim 3, in which said axial conduit (44) of said slide valve communicates with an outer annular groove (47) in the jacket face of said distributor (15) from which groove the relief line (49) leads away.

6. A fuel injection pump as defined by claim 4, in which said axial conduit (44) of said slide valve communicates with an outer annular groove (47) in the jacket face of said distributor (15) from which groove the relief line (49) leads away.

7. A fuel injection pump as defined by claim 3, in which said means that aligns with said plurality of conduit segments (55) include a second distributor opening on the distributor which runs in advance of a first distributor opening by an angle that is greater than an angular spacing interval between successive conduit segments (55) of said pressure lines and smaller than two such spacing intervals, preferably being 1½ times the spacing interval.

8. A fuel injection pump as defined by claim 1, in which said plurality of pump work chambers are connectable upon the intake stroke of the pump plungers, via a fill line (40) including a valve which communicates with a fuel supply source.

9. A fuel injection pump as defined by claim 8, in which said valve is a check valve.

10. A fuel injection pump as defined by claim 8, in which said valve is a slide valve controlled in synchronism with the drive shaft.

11. A fuel injection pump as defined by claim 1, in which said distributor (15) is disposed coaxially with and coupled to the drive shaft (2).

12. A fuel injection pump as defined by claim 1, in which said distributor (115) is driven by the drive shaft (102) via a gear (63, 64).

13. A fuel injection pump as defined by claim 5, in which said outer annular groove (47), on a side facing the distributor opening (53), has an increased width for the sake of balancing forces at the distributor.

14. A fuel injection pump as defined by claim 6, in which said outer annular groove (47), on a side facing the distributor opening (53), has an increased width for the sake of balancing forces at the distributor.

15. An electrically controlled fuel injection pump operative for direct fuel injection in internal combustion engines having externally supplied ignition, which comprises a plurality of pump plungers (29) each guided in a cylinder bore which forms associated pump work chambers, said pump plungers are driven at a constant stroke by a drive cam (4, 7; 104) driven by a drive shaft (2, 102) of a fuel injection pump, fuel is pumped by said plungers to an injection valve (56) in the cylinders of the engine, so long as an electrically controlled valve (50) shuts off the flow of the fuel flowing from said pump work chamber (35) via a relief conduit (49) to a chamber (23) of lower pressure, a connection between the pump work chambers (35) via an overflow conduit (37) can be shut off by a slide valve (46) driven in synchronism with the drive shaft (2, 102) is disposed in the fuel flow path and controls fuel flow from said plungers to said injection valves via a plurality of overflow conduits (37), said plurality of pump plungers (29) are driven by a common cam (104), and the overflow conduits (37) originating at the pump work chambers include conduit segments (37a, 37b) which discharge in a guide bore (117) of a distributor (115) driven by the drive shaft (102) and embodied as a slide of a rotary slide valve (46), said distributor includes a plurality of recesses (67, 68), via which in the course of rotation of the distributor (115) connects one at a time, the conduit segments (37a, 37b) of pump plunger (29) that is in the supply stroke phase with a segment (66, 44) of said overflow conduit (37) continuing on past the recesses, which segment communicates with a distributor opening (53), by means of which opening pressure lines (55) leading to said injection valves are successively connected to the overflow conduit (44) during the rotation of the distributor, and that the distributor is driven by the drive shaft via a gear (63, 64) and executes a lesser number of rotations than that of the drive shaft.

16. A fuel injection pump as defined by claim 15, in which said overflow conduit (44) communicates with an outer annular groove (47) from which the relief line (49) leads away.

17. A fuel injection pump as defined by claim 16, in which a second distributor opening (59) is provided on the distributor (115), which opening runs in advance of the first distributor opening (53) by an angle that is greater than the angular spacing interval between successive pressure lines (55) and smaller than two such spacing intervals, preferably being 1½ times the spacing interval.

18. A fuel injection pump as defined by claim 16, in which said pump work chambers (35) are connectable, via a fill line (40), in which a valve is disposed, with a fuel supply source.

19. A fuel injection pump as defined by claim 17, in which said pump work chambers (35) are connectable, via a fill line (40), in which a valve is disposed, with a fuel supply source.

20. A fuel injection pump as defined by claim 18, in which said valve is a check valve (41).

21. A fuel injection pump as defined by claim 18, in which said valve in the fill line (40) is a rotary slide valve embodied by the distributor (115).

22. A fuel injection pump as defined by claim 16, in which the outer annular groove (47), on the side facing the distributor opening (53), has an increased width for the sake of balancing forces at the distributor.

23. A fuel injection pump as defined by claim 12, in which said cam (104) has the form of a circular race located eccentrically with respect to the drive shaft axis.

* * * * *